(12) United States Patent
Tournier et al.

(10) Patent No.: US 8,433,451 B2
(45) Date of Patent: Apr. 30, 2013

(54) SUBSTATION AUTOMATION WITH REDUNDANT PROTECTION

(75) Inventors: Jean-Charles Tournier, Bellegarde sur Valserine (FR); Thomas Werner, Baden (CH)

(73) Assignee: ABB Research Ltd, Zürich (CH)

( * ) Notice: Subject to any disclaimer, the term of this patent is extended or adjusted under 35 U.S.C. 154(b) by 19 days.

(21) Appl. No.: 13/005,907

(22) Filed: Jan. 13, 2011

(65) Prior Publication Data

US 2011/0112699 A1  May 12, 2011

Related U.S. Application Data

(63) Continuation of application No. PCT/EP2009/060154, filed on Aug. 5, 2009.

(30) Foreign Application Priority Data

Aug. 29, 2008 (EP) .................................. 08163246

(51) Int. Cl.
*G05D 11/00* (2006.01)

(52) U.S. Cl.
USPC .......................... 700/292; 717/104; 709/221

(58) Field of Classification Search .................. 700/292; 709/221; 717/104
See application file for complete search history.

(56) References Cited

U.S. PATENT DOCUMENTS 6,166,451 A  12/2000 Pigott
2004/0073835 A1* 4/2004 Kim ................................ 714/13

(Continued)

FOREIGN PATENT DOCUMENTS

EP  0 948 111 A2  10/1999
EP  1 630 924 A2  3/2006

(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Mar. 10, 2011, in the corresponding International Application No. PCT/EP2009/060154.

(Continued)

*Primary Examiner* — Mohammad Ali
*Assistant Examiner* — Anthony Whittington
(74) *Attorney, Agent, or Firm* — Buchanan Ingersoll & Rooney PC

(57) ABSTRACT

Exemplary embodiments are directed to a redundancy scheme for bay protection in Substation Automation (SA) that prevents a single failing Intelligent Electronic Device (IED) of the SA system from impairing the operation of a bay of a substation. A protection IED assigned to a home or host bay of a substation of an electric power system performs the protection functions of the bay to which it is assigned, plus protection functions of at least one of its neighboring bays. As a result, each bay can be managed by two different protection IEDs, wherein redundancy is achieved without a dedicated redundant protection IED for each bay. Whenever required to do so, the protection IED receives, from appropriate sensors, information about a status or value of a process quantity from the neighboring bay, computes or executes protection functionality such as overcurrent, overvoltage or earth fault on behalf of the neighboring bay, and issues commands directed to actuators of said neighboring bay.

7 Claims, 1 Drawing Sheet

U.S. PATENT DOCUMENTS

| | | | |
|---|---|---|---|
| 2006/0074502 A1* | 4/2006 | McFarland | 700/47 |
| 2006/0117295 A1* | 6/2006 | Wu et al. | 717/104 |
| 2007/0057782 A1* | 3/2007 | Wimmer | 340/531 |
| 2007/0244573 A1* | 10/2007 | McFarland | 700/20 |
| 2008/0065270 A1* | 3/2008 | Kasztenny et al. | 700/286 |
| 2008/0104189 A1* | 5/2008 | Baker et al. | 709/206 |
| 2008/0244044 A1* | 10/2008 | Wimmer | 709/221 |
| 2008/0255709 A1* | 10/2008 | Balgard et al. | 700/292 |
| 2009/0005915 A1* | 1/2009 | Wimmer | 700/292 |

FOREIGN PATENT DOCUMENTS

| | | |
|---|---|---|
| EP | 1 646 185 A1 | 4/2006 |
| EP | 1 819 022 A1 | 8/2007 |
| EP | 1 976 177 A1 | 10/2008 |
| EP | 2 159 893 A1 | 3/2010 |
| WO | WO 2008/040263 A | 4/2008 |
| WO | WO 2009/010084 A1 | 1/2009 |

OTHER PUBLICATIONS

International Search Report (PCT/ISA/210) issued on Apr. 9, 2009, by European Patent Office as the International Searching Authority for International Application No. PCT/EP2009/060154.

Written Opinion (PCT/ISA/237) issued on Apr. 9, 2009, by European Patent Office as the International Searching Authority for International Application No. PCT/EP2009/060154.

European Search Report issued on Jan. 27, 2009.

Lars Andersson et al., "Substation Automation Based on IEC 61850 With New Process-Close Technologies", IEEE, Jun. 14, 2004, 6 pages, XP-002574668.

* cited by examiner

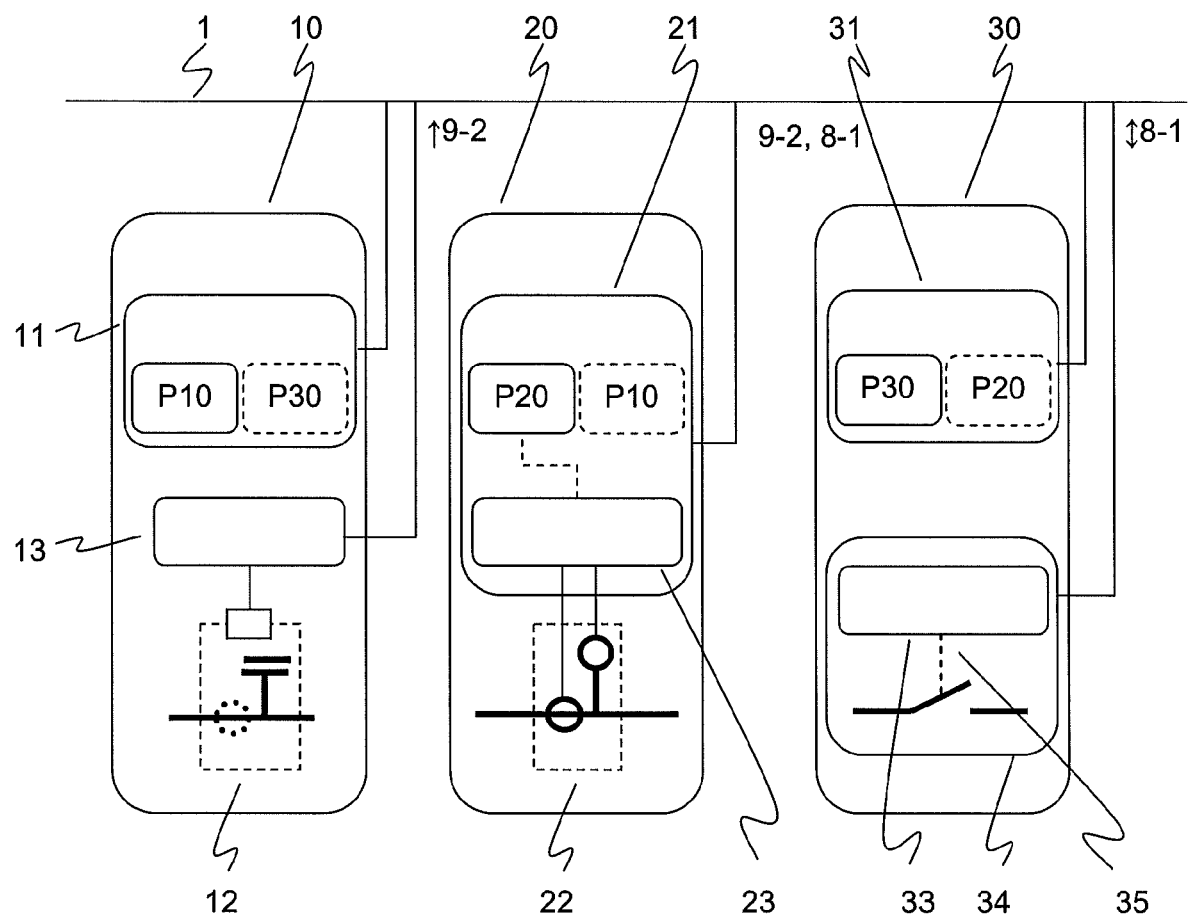

SUBSTATION AUTOMATION WITH REDUNDANT PROTECTION

RELATED APPLICATIONS

This application claims priority as a continuation application under 35 U.S.C. §120 to PCT/EP2009/060154, which was filed as an International Application on Aug. 5, 2009 designating the U.S., and which claims priority to European Application 08163246.5 filed in Europe on Aug. 29, 2008. The entire contents of these applications are hereby incorporated by reference in their entireties.

FIELD

The disclosure relates to a substation automation system, such as a redundant substation automation system for substations in high- and medium-voltage power networks that prevents a single failing Intelligent Electronic Device from impairing the operation of a bay of a substation.

BACKGROUND INFORMATION

Substations in high- and medium-voltage power networks include primary devices such as electrical cables, lines, bus bars, switches, power transformers and instrument transformers, which are generally arranged in switch yards and/or bays. These primary devices can be automated via a Substation Automation (SA) system. The SA system can include secondary devices, among which Intelligent Electronic Devices (IED), responsible for protection, control, and monitoring of the primary devices. The secondary devices can be assigned to hierarchical levels, i.e. the station level, the bay level, and the process level, the latter being separated from the bay level by a so-called process interface. The station level of the SA system includes an Operator Work Station (OWS) with a Human-Machine Interface (HMI) and a gateway to a Network Control Centre (NCC). IEDs assigned to the bay level, also termed bay units or protection IEDs, in turn can be connected to each other as well as to the IEDs assigned to the station level via an inter-bay or station bus for exchanging commands and status information.

Secondary devices assigned to the process-level can include sensors for voltage (VT), current (CT) and gas density measurements, contact probes for sensing switch and transformer tap changer positions, and/or actuators (I/O) for changing transformer tap positions, or for controlling switchgear like circuit breakers or disconnectors. Exemplary sensors such as non-conventional current or voltage transformers can include an Analogue to Digital (AD) converter for sampling of analogue signals. Each sensor can be connected to the bay units via a dedicated or intra-bay process bus, which can be used as the process interface, which replaces the conventional hard-wired process interface. The latter connects conventional current or voltage transformers in the switchyard to the bay level equipment via dedicated Cu wires, in which case the analogue signals of the instrument transformers are sampled by the bay units.

A communication standard for communication between the IEDs of a substation has been introduced by the International Electrotechnical Committee (IEC) as part of the standard IEC 61850 entitled "Communication networks and systems in substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet and/or RS-232C as physical media. For time critical messages, such as trip commands, IEC 61850-8-1 specifies that the Generic Object Oriented Substation Events (GOOSE) build directly on the Ethernet link layer of the communication stack. For very time-critical signals at the process level such as measured analogue voltages or currents, IEC 61850-9-2 specifies that the Sampled Values (SV) protocol also build directly on the Ethernet link layer. Hence, part 9 of the standard defines a format to publish, as multicast messages on an industrial Ethernet, digitized measurement data from current or voltage sensors on the process level. Such SV or other process data may be transmitted over an inter-bay process bus, making the transmitted information available to neighboring bays. For instance for cost effective setups such as in medium or low-voltage substations, the inter-bay process bus and the station bus can be merged into one single communication network. In this case, the communication network can be used an inter-bay process bus that transmits, in addition to the process data, command, status, and report related messages otherwise exchanged via a dedicated station bus.

In the context of Substation Automation, redundant protection functionality is used to achieve higher availability and reliability. For transmission and sub-transmission substations, full redundancy of protection functionality can be achieved with two independently installed and wired Intelligent Electronic Devices (IED) per bay. On the other hand, for medium- and low-voltage as well as industrial customer substations, a single IED protects the bay and therefore no redundant protection functionality is available. In the latter case, the IEDs represent a single point of failure for the entire bay.

Several approaches have been proposed to handle the failure of an IED. A hot-hot or hot-standby architecture is the classical approach for bays including two IEDs. In a hot-hot architecture, both IEDs are running in parallel. For a hot—standby architecture, the standby IED is taken into active use when the hot IED fails. Both approaches are conventionally realized by hard-wiring the inputs and outputs of both IEDs to the respective CTA/Ts (sensor input) and breaker actuators (I/O).

According to the patent application EP 1976177, in Substation Automation systems, the mean time to repair is reduced by the remote reconfiguration and start-up of a replacement or spare Intelligent Electronic Device (IED), allowing more time for the maintenance personnel to repair an inactive or faulty IED. The time required for the actual repair is irrelevant with respect to system availability as long as the repair time is short as compared to the IED failure rate. Therefore the remote configured spare IED leads to nearly the same availability as a hot—standby configuration, but without the need for doubling all the essential IEDs—where only one spare online IED is needed for each set of IEDs of the same type connected to the same station bus and process bus.

The patent application WO 2008/040263 discloses a first redundant protection system with three main protection IEDs plus one spare IED. The main IEDs are connected via dedicated "local process buses" and the spare IED is connected via an "inter-bay process bus" to respective protected objects. The buses transmit analogue values or digital sampled values, with possibly higher sampling rates on the local process buses than on the inter-bay bus. WO 2008/040263 further discloses a second redundant protection system with two IEDs acting in turn as main and auxiliary protection IEDs for two protected objects. Communication of process values can involve two distinct sensors on the same feeder, i.e. a first sensor for the main protection IED and a second sensor for the auxiliary protection IED.

SUMMARY

An exemplary embodiment is directed to a substation automation (SA) system. The SA system includes first and second protection Intelligent Electronic Devices (IEDs) that interact with sensors and actuators of a respective first and second bay of a substation of an electric power system, and perform protection functions for the respective bay; a first process interface adapted to be connected to sensors and actuators of the first bay; and an SA communication network communicatively connecting the first and second protection IEDs and the first process interface, wherein the first process interface transmits, over the communication network, sensor network messages that include sampled values of process quantities measured by the sensors of the first bay and receives, over the communication network, actuator network messages that include commands directed to the actuators of the first bay, and wherein the second IED performs a protection function based on a sensor network message transmitted by, and resulting in an actuator network message destined to the first process interface.

BRIEF DESCRIPTION OF THE DRAWINGS

The subject matter of the disclosure will be explained in more detail in the following text with reference to preferred exemplary embodiments which are illustrated in the attached drawing schematically showing:

The FIGURE illustrates a collaborative fault tolerant SA architecture in accordance with an exemplary embodiment.

The reference symbols used in the drawing, and their meanings, are listed in summary form in the list of reference symbols.

DETAILED DESCRIPTION

It is an objective of the present disclosure to prevent a single failing Intelligent Electronic Device (IED) of a Substation Automation (SA) system from impairing the operation of a bay of a substation, and to provide an alternative redundancy concept for bay-wise protection functionality.

According to the present disclosure, a protection IED formally assigned to a home or host bay of a substation of an electric power system and interacting, i.e. exchanging data and commands, with sensors and/or actuators of the home bay to which it is assigned, performs the protection functions of the home bay, plus protection functions of at least one of its neighboring bays. As a result, each bay can be managed by two different protection IEDs, wherein redundancy is achieved at a software level rather than at a hardware level, i.e. there is no need to provide a dedicated redundant protection IED for each bay. During operation, the protection IED receives information about a status or value of a process quantity from the neighboring bay, computes or executes protection functionality such as overcurrent, overvoltage or earth fault on behalf of the neighboring bay, and issues commands directed to actuators of said neighboring bay.

In an exemplary embodiment of the present disclosure, the actuators and sensors of a home bay can be accessible from a protection IED assigned to a neighboring bay, in a manner that is independent of the protection IED assigned to the home bay. A process interface is connected to sensors and actuators of the home bay as well as to an SA communication network or inter-bay bus. The process interface is adapted to send sensor network messages including values of a process quantity of the home bay as provided by one of the sensors connected, such as sampled values of a signal indicative of a current or voltage according to IEC 61850-9-2, over the communication network to the neighboring protection IED. Likewise, the process interface is adapted to receive actuator network messages from the neighboring protection IED and including commands according to IEC 61850-8-1 directed to an actuator of the bay. The term "process interface" corresponds to a bay-wide functionality that can be realized by a single physical process interface unit or a plurality of physical process interface units connected each to at least one sensor or actuator of the bay and individually connected to the communication network.

According to the present disclosure, a protection IED can be optionally hardwired to respective sensors in order to receive the necessary information required for computing a specific protection function. It is also possible for a protection IED to subscribe to a data stream which is available on the system-wide SA communication network. The process data is published by a process interface, i.e. either a sensor device itself incorporating Analogue to Digital (AD) converter functionality and being directly connected to the communication network, a different protection IED making its local measurements available, or a Merging Unit (MU) merging instantaneous signals of a plurality of connected sensors into a single network message.

In an exemplary embodiment of the present disclosure, if the substation includes more than two bays, all the IEDs and all the process interfaces can be communicatively connected to the same communication network or inter-bay bus. The various actuator network messages transmitted over the bus can include, in addition to a network source and destination address indicative of the sending and receiving IED or process interface, an identification of the targeted actuator or primary device.

In another exemplary embodiment of the present disclosure, the process interface can be included in the housing of a protection IED that is hardwired to sensors and actuators of the assigned home bay to be protected. However, the process interface does not include a central processing unit (CPU) or field programmable gate array (FPGA) processing means, a power supply, and a network interface card, i.e. at least one of said components is duplicated within the housing of said protection IED. Hence, if one of the duplicated components of said protection IED fails and prevents the protection IED from executing protection functions, the process interface functionality can continue to operate and provide access to the sensors/actuators.

In another exemplary embodiment of the present disclosure, the process interface is included in a standalone device or Merging Unit (MU) separate from the IEDs and connected, via dedicated Cu wires or via a dedicated or intra-bay process bus according to 61850-9-2 or any other suitable protocol, to sensors of the home bay to be protected. The MU can be adapted to time-sync the samples from the different sensors, pack them into one sensor message, and "republish" them on the SA communication network to make available process data to both the first or home protection IED as well as a second or neighboring protection IED.

In an exemplary embodiment of the present disclosure, the redundant protection function at the neighboring IED can be implemented as an active or hot/hot redundancy. On the other hand, and if additionally specified, redundant control functionality such as switch control, interlocking, or autoreclosure, can be implemented as a hot/standby redundancy which becomes operational if the home IED fails. To detect this occurrence, the neighboring IED has a capability to monitor the primary control function of the home IED (e.g. by means of a heartbeat signal).

The fault tolerant SA architecture as described in the present disclosure achieves the same level of availability as the one achieved by a hot-hot or hot-standby approach, but at a lower cost since only one IED per bay, instead of two, is required. This configuration can be useful in medium voltage and industrial customer substations. Compared to conventional secondary substation equipment for medium voltage substations, the mean time to repair shrinks from several hours to almost instantly since the redundant functions are already configured and ready to act on behalf of a faulty home IED. Another advantage is that an IED can be serviced while the bay is still being protected through its neighboring IED.

The FIGURE shows an exemplary collaborative fault tolerant Substation Automation (SA) architecture for a substation with three bays 10, 20, 30. The SA system includes a communication network 1 and three protection Intelligent Electronic Devices (IEDs) 11, 21, 31, each one of which executes protection functions P10, P20, P30 for a respective bay 10, 20, 30. To this end, protection IEDs 11, 21, 31 evaluate input from sensors, and operate actuators, of the respective bay.

Moreover, the first bay 10 includes non-conventional current and voltage sensors 12 that capture the current and voltage at a particular location of bay 10. The sensors 12 are connected to a stand-alone merging unit (MU) 13 as an exemplary first process interface which in turn is connected to the communication network 1. The connection between sensors 12 and MU 13 can include A/D converters at the sensors and a dedicated intra-bay or process bus. The MU 13 publishes multicast messages, e.g. according to IEC 61850-9-2, on the network 1. The second bay 20 includes conventional instrument transformers 22 that are hardwired to protection IED 21. The protection IED 21 incorporates the functionality of an exemplary second process interface 23 and in turn includes an interface to communication network 1 that allows the multicasting of messages with process data from the instrument transformers 22. In bay 30, the exemplary third process interface 33 is part of a breaker IED 34 and adapted to receive event-driven commands, e.g. according to IEC 61850-8-1, and to operate a drive 35 as an exemplary actuator of a switching device in response thereto.

As exemplified in the foregoing, different types of sensors and actuators can be connected in various ways to a process interface. The process interface being a node in the SA communication network. The process interface can be part of either a sensor device itself incorporating Analogue to Digital (A/D) converter functionality and directly connected to the communication network, a different protection IED making its local measurements available, or a Merging Unit (MU) merging instantaneous signals of a plurality of connected sensors into a single network message.

As depicted by the dashed rectangle, protection IED 21 can be additionally adapted to execute protection functions P10 on behalf of bay 10 by evaluating the (IEC 61850-9-2) messages published by MU 13 and operating actuators (via IEC 61850-8-1) of bay 10. Likewise, protection IEDs 31 and 11 provide redundant protection functionality P20, P30 on behalf of bays 20, 30 and their peer-IEDs 21, 31, respectively. The logical chaining of redundant protection as depicted can be replaced by any arbitrary and incomplete assignment of a deputy protection IED.

Presuming adequate processing power, one of the protection IEDs could also handle protection functions for more than one neighboring bay. If each IED is powerful enough to manage n>2 bays, the number of supported IEDs which can be down at the same time goes up to n−1.

In an exemplary embodiment that increases the availability of the SA system, architecture can include a classical redundancy scheme involving a redundant or backup (hot-hot or hot-standby) IED assigned to each of the primary IEDs. Each primary and redundant IED can be implemented to use the functions of its own bay plus one of its neighbors. In this instance, the level of availability is higher (at most=N+1 IEDs can be down, if N is the number of bays in a substation) at no extra cost. The main advantage of this embodiment provides that the primary and redundant IEDs located in the same bay can both be down at the same time. Moreover, this first extension allows increasing the level of availability by having IEDs from different vendors for the primary and redundant IEDs.

According to another exemplary embodiment of the present disclosure, the above-described embodiments can be combined with a spare IED as disclosed in the patent application EP 1976177. As a result, any two IEDs, and in particular even two neighboring IEDs, can be down at the same time. In this embodiment, the configuration of a failing IED to be transferred to the spare IED includes both the protection functions of the failing IED's home bay as well as the redundant protection functions on behalf of a neighboring bay.

In another exemplary embodiment, the embodiments described above can be combined with both a redundant architecture and the above spare IED. If N is the number of bays, the number of IEDs is thus equal to 2N+1, but The N+2 of them can be down.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 SA communication network
10, 20, 30 bay
11, 21, 31 protection IED
12, 22 sensor
13, 23, 33 process interface
34 breaker IED
35 actuator

What is claimed is:
1. A Substation Automation system comprising:
first and second protection Intelligent Electronic Devices that interact with sensors and actuators of a respective first and second bay of a substation of an electric power system, and perform protection functions for the respective first or second bay;
a first process interface connected to sensors and actuators of the first bay;
a substation automation communication network communicatively connecting the first and second protection IEDs and the first process interface;
a third protection IED that interacts with sensors and actuators of a third bay of the substation, and performs a protection function for the third bay; and
a second process interface connected to sensors and actuators of the second bay, wherein the first process interface transmits, over the communication network, sensor network messages that include sampled values of process quantities measured by the sensors of the first bay and receives, over the communication network, actuator network messages that include commands directed to the actuators of the first bay, wherein the second protection IED performs a protection function based on a sensor network message transmitted by, and resulting in an actuator network message destined to the first process interface, wherein the second process interface and the third protection IED are communicatively connected to the communication network, and wherein the third IED performs a protection function based on network message transmitted by and destined to the second process interface.

2. The substation automation system according to claim 1, wherein the actuator network messages include an identification of the actuator to which the command is directed.

3. The substation automation system according to claim 1, wherein the first process interface includes partial functionality of the first protection IED.

4. The substation automation system according to claim 1, wherein the first process interface is a separate device transmitting the sensor network messages, over the communication network, to both protection IEDs.

5. The substation automation system according to claim 1, wherein the second protection IED performs, in a hot-standby redundancy configuration, control functions on behalf of the first bay.

6. The substation automation system according to claim 1, further comprising:
   a single spare redundant IED connected to the communication network and configured with protection functions for any two bays.

7. A use of a substation automation system according to claim 1 in a medium voltage or industrial customer substation.

* * * * *